United States Patent
Albright et al.

(10) Patent No.: US 9,658,988 B2
(45) Date of Patent: May 23, 2017

(54) SYSTEMS AND METHODS TO SEGMENT TEXT FOR LAYOUT AND RENDERING

(71) Applicant: Google Inc., Mountain View, CA (US)

(72) Inventors: Matthew Albright, Montclair, NJ (US); Luiz do Amaral de Franca Pereira Filho, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 14/055,075

(22) Filed: Oct. 16, 2013

(65) Prior Publication Data

US 2015/0106698 A1    Apr. 16, 2015

(51) Int. Cl.
| | |
|---|---|
| *G06F 17/00* | (2006.01) |
| *G06F 17/21* | (2006.01) |
| *G06F 17/25* | (2006.01) |
| *G06F 17/27* | (2006.01) |
| G06F 17/30 | (2006.01) |
| G06F 17/22 | (2006.01) |
| G06F 17/28 | (2006.01) |

(52) U.S. Cl.
CPC ............ *G06F 17/211* (2013.01); *G06F 17/25* (2013.01); *G06F 17/2765* (2013.01); *G06F 17/2247* (2013.01); *G06F 17/289* (2013.01); *G06F 17/30864* (2013.01); *G06F 17/30905* (2013.01)

(58) Field of Classification Search
CPC .... G06F 17/241; G06F 17/24; G06F 17/2765; G06F 17/276; G06F 17/2785; G06F 17/2795; G06F 12/04; G06F 12/0866; G06F 17/30864; G06F 17/2247; G06F 17/30905; G06F 17/289

USPC ................ 715/257–261; 704/243–276, 4–10
See application file for complete search history.

(56) References Cited

U.S. PATENT DOCUMENTS

| | | | | |
|---|---|---|---|---|
| 2011/0173532 | A1* | 7/2011 | Forman ................. | G06F 17/211 715/256 |
| 2011/0252303 | A1* | 10/2011 | Lemonik ............... | G06F 17/218 715/234 |
| 2012/0128251 | A1* | 5/2012 | Petrou ............... | G06F 17/30253 382/182 |

OTHER PUBLICATIONS

Anonymous: "The End of a Pilgrimage to Find a More Robust WordWrap Function", Experts Exchange, Apr. 8, 2012, XP055172605, Retrieved from the Internet: URL:http://www.experts-exchange.com/Programming/Languages/Visual_Basic/A_10064-The-end-of-a-pilgrimage-to-find-a-more-robust-WordWrap-function.html [retrieved on Feb. 27, 2015], 19 pages.

(Continued)

*Primary Examiner* — Quoc A Tran
(74) *Attorney, Agent, or Firm* — Ropes & Gray LLP

(57) ABSTRACT

A method for segmenting text for layout on a web browser includes receiving a block of text at a client computer and defining a plurality of regular expressions, where a first regular expression in the plurality of regular expressions is used to search for a word or a word boundary. The client computer segments the block of text into a plurality of text segments, where the segmenting includes searching the block of text starting at a defined location for a first text segment that matches any of the plurality of regular expressions, adding the first text segment to the plurality of text segments, and updating the defined location to be located at the end of the first text segment within the block of text. The client computer then constructs a layout of the block of text using the plurality of text segments.

29 Claims, 5 Drawing Sheets

(56) References Cited

OTHER PUBLICATIONS

Anonymous: "UAX #14: Unicode Line Breaking Algorithm", Unicode Technical Reports, Sep. 20, 2013, XP055172625, Retrieved from the Internet: URL:http://www.unicode.org/reports/tr14/tr14-32.html [retrieved on Feb. 27, 2015] section 3.1, 48 pages.
International Search Report and Written Opinion in Application No. PCT/US2014/059743 dated Mar. 5, 2015, 13 pages.
Knuth et al., "Breaking Paragraph Into Lines", Software Practice & Experience, Wiley & Sons, Bognor Regis, GB, vol. 11, No. 11, Feb. 6, 1981, pp. 1119-1184, XP008002517, ISSN: 0038-0644, DOI: 10.1002/SPE.4380111102.
Odgaard, "Wrapping Text with Regular Expressions", TextMate Blog, Jun. 28, 2006, XP055172556, Retrieved from the Internet: URL:http://blog.macromates.com/2006/wrapping-text-with-regular-expressions/ [retried on Feb. 27, 2015], 8 pages.
Padolsey, "'Wordwrap' for JavaScript", Jun. 26, 2009, XP055172550, Retrieved from the Internet: URL:http://james.padolsey.com/snippets/wordwrap-for-javascript/ [retrieved on Feb. 27, 2015], 2 pages.
Reps, "Maximal-Munch Tokenization in Linear Time", ACM Transactions on Programming Languages and Systems, vol. 20, No. 2, Mar. 1998, pp. 259-273, XP001148442, DOI: 10.1145/276393.276394, 15 pages.

\* cited by examiner

300

For there never was a 故事 of more woe
Than this☹of Juliet    and her Romeo

302 — "For there"; 304 — "故事"; 308 — "woe"; 310 — "☹"; 312 — (tab)

| F | o | r | [sp] | t | h | e | r | e | [sp] |
|---|---|---|------|---|---|---|---|---|------|
| n | e | v | e | r | [sp] | w | a | s | [sp] |
| a | [sp] | 故 | 事 | [sp] | o | f | [sp] | m | o |
| r | e | [sp] | w | o | e | [lb] | T | h | a |
| n | [sp] | t | h | i | s | # | o | f | [sp] |
| J | u | l | i | e | t | [tab] | a | n | d |
| [sp] | h | e | r | [sp] | R | o | m | e | o |

| F | o | r | [sp] | t | h | e | r | e | [sp] |
|---|---|---|---|---|---|---|---|---|---|
| n | e | v | e | r | [sp] | w | a | s | [sp] |
| a | [sp] | 故 | 事 | [sp] | o | f | [sp] | m | o |
| r | e | [sp] | w | o | e | [lb] | T | h | a |
| n | [sp] | t | h | i | s | # | o | f | [sp] |
| J | u | l | i | e | t | [tab] | a | n | d |
| [sp] | h | e | r | [sp] | R | o | m | e | o |

FIG. 5

SYSTEMS AND METHODS TO SEGMENT TEXT FOR LAYOUT AND RENDERING

BACKGROUND

Internet services provide a variety of content and functionality to users on client computers. Web browsers executing on the client computers receive, render, and display content provided by web servers running the services. An example of an Internet service is a cloud computing service that allows users to create, edit, store, and share files online. The files are stored on the cloud computing service rather than the client computers. The cloud computing service provides a user interface to the user's web browser for the display and editing of files. Files that may be stored on cloud computing services include word processing documents, spreadsheets, presentations, audiovisual files, and pictures.

Web browsers display text from content provided by web servers, such as text in files stored on a cloud computing service. The web browser receives text, and renders it for display on the display screen of the client computer. The web browser determines the layout of text on the screen, for example determining the locations in the text where line breaks should be inserted based on the font style and size of the text, the space allocated for the text, the size of the browser window, and other such constraints. The web browser processes text character by character to determine if a line break or other spacing may be inserted after such character. For example, the web browser may determine that a letter character that is followed by another letter character cannot have a line break inserted after the first letter character while a letter character followed by a space character may have a line break inserted after the letter character. However, processing text character by character to check for line break possibilities is a time consuming process, especially for large blocks of text. This produces latency in displaying text from a web server on a client computer.

SUMMARY

The systems and methods described herein provide ways to segment text into larger segments than characters before determining the layout of the text, for example into words and word boundaries. A line break may be inserted between each text segment. Identifying words and word boundaries rather than processing the text a character at a time reduces the time necessary for constructing the layout of the text. The text is segmented using regular expressions. A "regular expression" is a programming language object constructed using a specific syntax that defines a pattern of characters. Regular expressions are used in many programming languages to search text for specific patterns of characters as defined by the regular expressions. For example, regular expressions may be constructed for identifying words in text and for identifying word boundaries such as spaces, tabs, and breaks. Regular expressions are used to break a block of text into word segments and word boundary segments such that line breaks may be inserted between any two consecutive segments. This is more efficient than checking whether a line break may be inserted after each individual character of the text. The web browser on a client computer receives a block of text from a server. Starting from the beginning of the text, regular expressions are used to search for the first occurring word or a word boundary. The word or word boundary is saved as a segment of text and the next word or word boundary is determined. The entire block is segmented in this fashion and the web browser uses the text segments to determine the layout of text on the screen of the client computer, inserting line breaks between text segments as needed to wrap text to new lines. The segmenting process also takes into consideration locations of plug-in objects within the text, changes in text direction or style, and special rules for certain Asian or other languages.

One aspect described herein discloses a method for segmenting text for layout on a web browser, where the method includes receiving a block of text at a client computer and defining a plurality of regular expressions, where a first regular expression in the plurality of regular expressions is used to search for a word or a word boundary. The method further includes segmenting the block of text into a plurality of text segments, where the segmenting includes searching the block of text starting at a defined location for a first text segment that matches any of the plurality of regular expressions, adding the first text segment to the plurality of text segments, and updating the defined location to be located at the end of the first text segment within the block of text. The method further includes constructing a layout of the block of text using the plurality of text segments.

Another aspect described herein discloses an apparatus for segmenting text for layout on a web browser. The apparatus includes a client computer configured to receive a block of text and define a plurality of regular expressions, where a first regular expression in the plurality of regular expressions is used to search for a word or a word boundary. The client computer is further configured to segment the block of text into a plurality of text segments, where the segmenting includes searching the block of text starting at a defined location for a first text segment that matches any of the plurality of regular expressions, adding the first text segment to the plurality of text segments, and updating the defined location to be located at the end of the first text segment within the block of text. The client computer is further configured to construct a layout of the block of text using the plurality of text segments.

Another aspect described herein discloses a system for segmenting text for layout on a web browser, where the system includes a plurality of client computers and a server configured to provide each of the plurality of client computers with a layout engine. The layout engine allows each client computer to perform a method that includes receiving a block of text from the server and defining a plurality of regular expressions, where each of the plurality of regular expressions is used to search for a word or a word boundary. The method further includes segmenting the block of text into a plurality of text segments, where the segmenting includes searching the block of text starting at a defined location for a first text segment that matches any of the plurality of regular expressions, adding the first text segment to the plurality of text segments, and updating the defined location to be located at the end of the first text segment within the block of text. The method further includes constructing a layout of the block of text using the plurality of text segments.

BRIEF DESCRIPTION OF THE DRAWINGS

The methods and systems may be better understood from the following illustrative description with reference to the following drawings in which:

FIG. 3 shows an example of a section of text in accordance with an implementation as described herein;

FIG. 4 shows an example of a spacer array containing a section of text in accordance with an implementation as described herein;

FIG. 5 shows an example of segmentation of text using regular expressions in accordance with an implementation as described herein.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing a way to segment text for layout on a web browser using regular expressions. The text is segmented into words or word boundaries using regular expressions such that line breaks may be inserted between any two consecutive text segments. This process is faster than checking whether a line break may be inserted after each character. The web browser on a client computer receives a block of text from a server. Starting from the beginning of the text, regular expressions are used to search for the first occurring word or a word boundary. The word or word boundary is saved as a segment of text and the next word or word boundary is determined. The entire block is segmented in this fashion and the web browser uses the text segments to determine the layout of text on the screen of the client computer. The segmenting process also takes into consideration locations of plug-in objects within the text, changes in text direction or style, and special rules for certain Asian or other languages.

Figure 1:
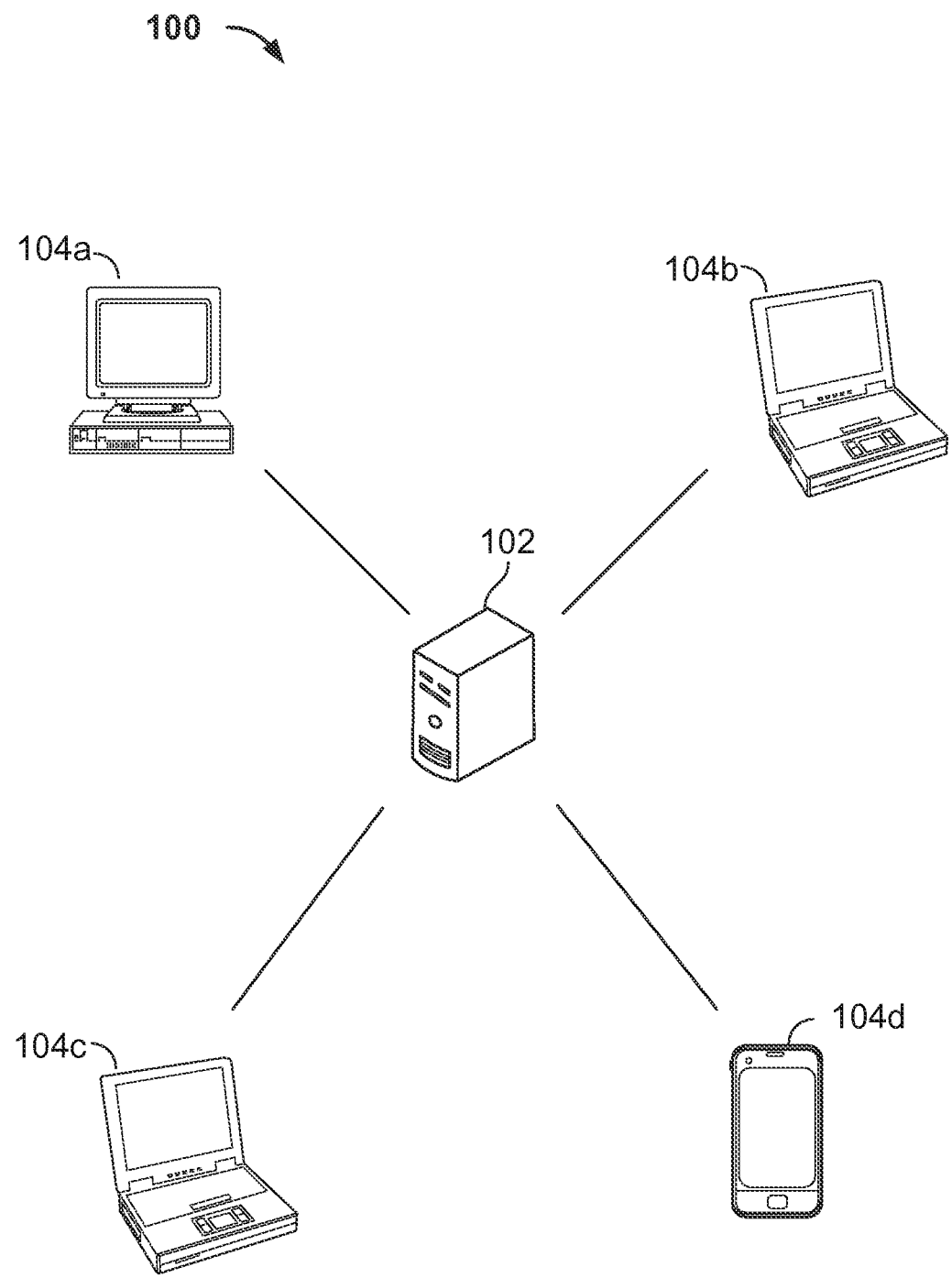
FIG. 1 shows a number of client computers in communication with a server in accordance with an implementation as described herein.

First, a network system in which a number of client computers may connect to a server is described. FIG. 1 shows a network system 100 that includes server 102 and a number of client computers 104a through 104d. Server 102 may include one or more computing devices that collectively provide online content and services for a number of client computers. One example of a service that may be provided by server 102 is a cloud computing service that stores a number of files accessible by client computers 104a-104d. The files may include word processing documents, spreadsheets, presentations, images, audio files, video files, or any other files of various open or proprietary file types. Users may create, edit, copy, share, and delete files stored on the cloud computing service. Client computers 104a-104d may include desktop computers, laptop computers, tablets, smart phones, mobile electronic devices, or any other device that may connect to server 102. System 100 may include many additional client computers not pictured in FIG. 1. The network connection between the client computers 104a-104d and server 102 in network system 100 may be facilitated through a local area network, wide area network, Ethernet, fiber optic network, or any other wired or wireless connection.

Figure 2:
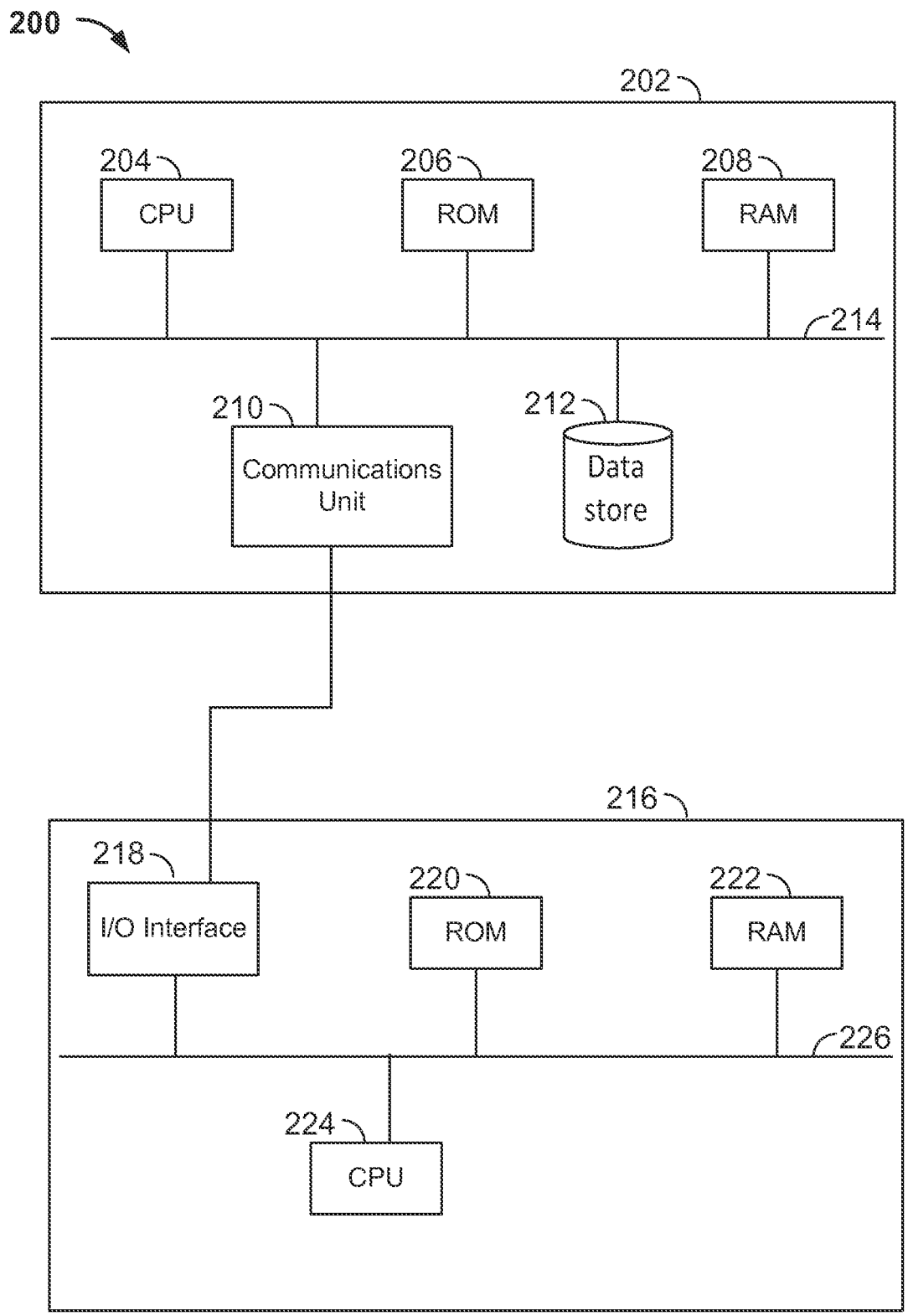
FIG. 2 shows the components of a server in communication with a client computer in accordance with an implementation as described herein.

The components of a client computer and a server in communication with each other are now described in more detail. System 200 in FIG. 2 includes a server 202 in communication with a client computer 216. Server 202 includes a central processing unit (CPU) 204, read-only memory (ROM) 206, random access memory (RAM) 208, communications unit 210, data store 212, and bus 214. Server 202 may have additional components that are not illustrated in FIG. 2. Bus 214 allows the various components of server 202 to communicate with each other. Communications unit 210 allows server 202 to communicate with other devices, such as client computer 216 and other client computers. Data store 212 is used to store content accessible by a user on client computer 216.

Client computer 216 includes a CPU 224, ROM 220, RAM 222, input/output interface 218, and bus 226. Client computer 216 may have additional components that are not illustrated in FIG. 2. Bus 226 allows the various components of client computer 216 to communicate with each other. Input/output interface 218 allows client computer 216 to communicate with other devices, such as server 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display content and services provided by server 202. Web browsers receive web page documents encoded in HTML, CSS, or other web-compatible languages and interpret the language to properly display the web page.

Data store 212 for storing content on server 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CD-ROM, CD-R, CD+R, CD-RW, CD+RW, DVD-ROM, DVD-R, DVD+R, DVD-RW, and DVD+RW).

Servers may store text that is provided to users on client computers. For example, a web server may store web pages that are displayed on web browsers executing on client computers. In another example, a cloud computing service may store files that include text and provide web browsers with a user interface for displaying the content of the file. The user interface includes a layout and rendering engine that determines how the content of the file is displayed on the screen of the client computer. Thus the web browser is responsible for the layout and rendering of content, including text. The layout of the text and the locations where text is wrapped to new lines depends on the font size and style, space allocated for the text, the size of the browser window, and other such factors. While text may contain line breaks, paragraph breaks, and other formatting commands that force new lines of text, much of the layout of the text is determined by the web browser.

FIG. 3 shows an example of a portion of text 300. The portion of text includes words and word boundaries such as spaces, tabs, and breaks. For example, space 302 between the words "there" and "was" indicate a word boundary. Space 302 indicates that the web browser may break text 300 into two lines at space 302 while determining the layout of text 300. There is a tab 312 between the words "Juliet" and "and" that also indicates a word boundary and a possible line break location. A forced line break 308 occurs after the word "woe" and so the web browser always starts a new line after the word "woe." Characters 304 represent the Chinese word for "story." There are two characters, but because they form one word the web browser should not place the two characters on different lines of text. Spaces between words do not occur in Chinese text and thus the web browser has to determine which characters represent word units that should not be separated. Lastly, plug-in object 310 appears between the words "this" and "of." Because plug-in object 310 is not text, line breaks may occur before and after object 310. Plug-in object 310 may be any plug-in inserted into the text, such as an image, video, equation, table, graph, or other non-text object. As text 300 shows, the process of determining where new lines of text may occur is complex. Web browsers usually inspect text character by character to determine locations where the text may be wrapped to a new line. However, this process is time consuming, especially for large amounts of text.

The systems and methods described herein allow web browsers to use regular expressions to segment text into units that may include multiple characters. For example, text may be segmented into words and word boundaries. Once segmented, the web browser may insert line break locations between any two consecutive text segments when arranging the layout of the text on a display screen. This allows the web browser to complete the layout process faster than if the web browser processed the text character by character to identify possible line break locations. For example, a block of text may contain 80 characters forming 12 words, with a space between each word. Rather than inspecting all 80 characters to determine whether a line break may be inserted after each one, the web browser identifies the 12 words and 11 spaces between each word as text segments, where line breaks may be inserted between any two consecutive text segments. This reduces the amount of time needed by the web browser to configure the layout of the text. A "regular expression" is a programming language object constructed using a specific syntax that defines a pattern of characters. Regular expressions are used in many programming languages to search text for specific patterns of characters as defined by the regular expressions. Regular expressions may be constructed to find certain words in text, for example all words that end in "ing" or begin with "thr". Moreover, regular expressions may be constructed to find all words in text, and may also be constructed to find non-word components in text, such as spaces, tabs, breaks, and other word boundaries. Regular expressions may also be used to find plug-in objects occurring within text. Regular expressions are implemented in a variety of programming languages such as Java and C++. Regular expressions are constructed using a special syntax, which is discussed below. A web browser may use regular expressions to segment text into discrete word and non-word segments. For layout purposes, a line break may occur between any two consecutive text segments.

A server provides web browsers with a layout engine that performs text segmentation and layout functions for the content provided by the server. The layout engine is loaded into the cache of the web browser and is used by the web browser to lay out text provided by the server. The layout engine first creates a spacer array to store the text. FIG. 4 shows a spacer array 400 for text 300 in FIG. 3. Spacer array 400 is a table or matrix, where cells of array 400 store each character or non-word component in the text. For example, each letter in text 300 is placed in a separate cell. Non-word components are also stored in cells, such as spaces (represented as [sp] in FIG. 4), tabs (represented as [tab]) and forced line breaks (represented as [lb]). Each Chinese character is stored in a separate cell. Plug-in object 310 in FIG. 3 is represented in spacer array 400 by a special character (shown as #). The client computer stores a plug-in registry which associates special characters with plug-in objects. The special characters are used in the text as a placeholder for the plug-in objects during the layout and rendering process. When the text is actually rendered, the plug-in objects are inserted at the locations of their corresponding special characters.

After the layout engine stores the text in a spacer array, the layout engine segments the text into words. The layout engine starts at the beginning of the spacer array and searches the array using regular expressions that capture all words and word boundaries. For example, the regular expressions that the layout engine searches for may include the following three regular expressions:

(+\u000c?|[^ \u000b\u000c\t\n]+|[\u000b\u000c\t\n])

where \u000c represents a page break, \u000b represents a line break, \t represents a tab, and \n represents a paragraph break. Regular expressions have specific syntax: the "?" indicates that the layout engine should search for zero or one of the preceding element, the "|" is an OR symbol, the "+" indicates that the layout engine should search for one or more of the preceding element, square brackets indicates that the layout engine should match a single character contained within the brackets, and "[^ ]" indicates that the layout engine should match a single character that is not contained in the brackets. Thus the first regular expression shown above matches at least one space followed by zero or one page breaks. The second regular expression matches a series of consecutive elements that don't include a page break, line break, tab, or paragraph break (i.e. any word). The third regular expression matches a page break, line break, tab, or paragraph break. The three regular expressions taken together captures all words and all word boundaries that include spaces, page breaks, paragraph breaks, line breaks, and tabs.

The layout engine may search a block of text using other regular expressions in addition to the ones discussed above. For example, line break boundaries for Chinese, Japanese, and Korean languages (the "CJK" languages) may be defined using regular expressions. The character set model of the CJK languages may include a set of character classes that define characters after which a line may break. A regular expression is formulated to search for this set of character classes. Two more regular expressions are used to match characters that cannot be before a line break and characters that cannot be after a line break. Using these three regular expressions, a segmentable word in CJK languages may be defined as:

[cannot precede a break]*[other characters][cannot follow a break]* where * is regular expression syntax for matching zero or more of the preceding element. Thus a segmentable CJK word begins with zero or more characters that cannot precede a break, includes one or more characters after which a break may occur, and may end with zero or more characters that cannot follow a break.

The layout engine may also use regular expressions to search for special characters that represent plug-in objects. A plug-in registry associates plug-in objects with special character values that are inserted into the text. The plug-in registry may be stored on the server and sent to the client computer along with the layout engine. The layout engine may use regular expressions formulated to search for the special character values associated with plug-in objects. The plug-in object becomes a segmentable object such that line breaks may occur before or after the plug-in object. For example, in spacer array 400 the "#" character is a special character value that represents a plug-in object. The text may be segmented before and after the "#" character.

The layout engine starts that the beginning of spacer array 400 and find the first set of elements that matches any one of the regular expressions discussed above. The set of elements is stored as a text segment, and then the next consecutive text segment is identified using the regular expressions. The layout engine continues searching the text using the regular expressions until the spacer array has been completely segmented. For example, the layout engine may have a getNextWord function that is defined as:

```
docs.text.view.SpacerString.prototype.getNextWord(startIndex) {
    var regexp = new RegExp('( +\u000c? | [ ^ \u000b\u000c\t\n]+ |
'[u000b\u000c\t\n])', mg');
    regexp.lastIndex = startIndex;
    var match = regexp.exec(this.spacers_);
    return match == null ? null : match[0];
}
```

The getNextWord function takes as input a startIndex, which tracks the location within the spacer array that the layout engine has yet to search. The function stores a text segment regexp that matches any of the regular expressions that getNextWord searches for, starting at the startIndex. The regular expressions may include any of the regular expressions discussed above matching words, word boundaries, CJK language characters, plug-in objects, and any other element found in the text and described by a regular expression. Once a match is found, the startIndex is updated to point to the end of the text segment. The text segment is then outputted and the layout engine stores the text segment in an array. While the getNextWord function is an example of one way to segment text into words and word boundaries, the layout engine may implement other ways to segment text using regular expressions.

The layout engine may also segment text based on changes in the text direction. The text direction is stored at the character level, for example as part of the metadata for that character. Thus regular expressions cannot be used to find locations where text changes. However, the layout engine may scan the spacer array to determine the location of text direction changes. The locations of text direction changes are stored and consulted by the layout engine during the text segmentation process. If the text direction changes in the middle of an identified text segment, the segment should be split at the location of the text direction change.

The layout engine may also segment text based on changes in the text style, such as changes in the text font or size, or changes in underlining, italics, bolding, or other text formatting styles. The style of text is stored at the character level, similar to the text direction, and thus regular expressions cannot be used to find locations of text style changes. The layout engine may scan the spacer array to determine the location of text style changes. The locations of text style changes are stored and consulted by the layout engine during the text segmentation process. If the text style changes in the middle of an identified text segment, the segment should be split at the location of the text style change.

Additional post-processing steps may occur after the layout engine segments the text using the getNextWord function. For example, if the text includes any Thai language then a separate application programming interface (API) on the web browser may be used to segment Thai characters into text segments. The Thai sentence structure follows different rules than English or the CJK languages, so a separate process is used to segment Thai characters. Other languages may similarly also require post-processing to properly segment the text.

The layout engine processes the entirety of the text into text segments, where a line break may occur before or after each text segment but not in the middle of a segment. FIG. 5 shows a text segment array 500 constructed from spacer array 400 in FIG. 4. Each word and word boundary becomes a text segment, as well as the special character value representing the plug-in object and the Chinese word for story. If any text direction changes or text style changes occur within the text, the text could additionally be segmented at those locations. Also, special language APIs may be used to further segment the text if those languages appear within the text. Text segment array 500 may store the actual text as segments or may store pointers to the spacer array that define the start and end of each text segment. Text segment array 500 may also store other information such as the text styles for each text segment, and the size allocated for the block of text. After the text is fully segmented, the layout engine uses text segment array 500 to generate a layout for the text, which is then rendered and displayed on the web browser. Each text segment is considered a unit, and so the layout engine may insert line breaks before or after each text segment but not in the middle of a text segment. Thus the layout engine processes text by word rather than by character.

Figure 6:
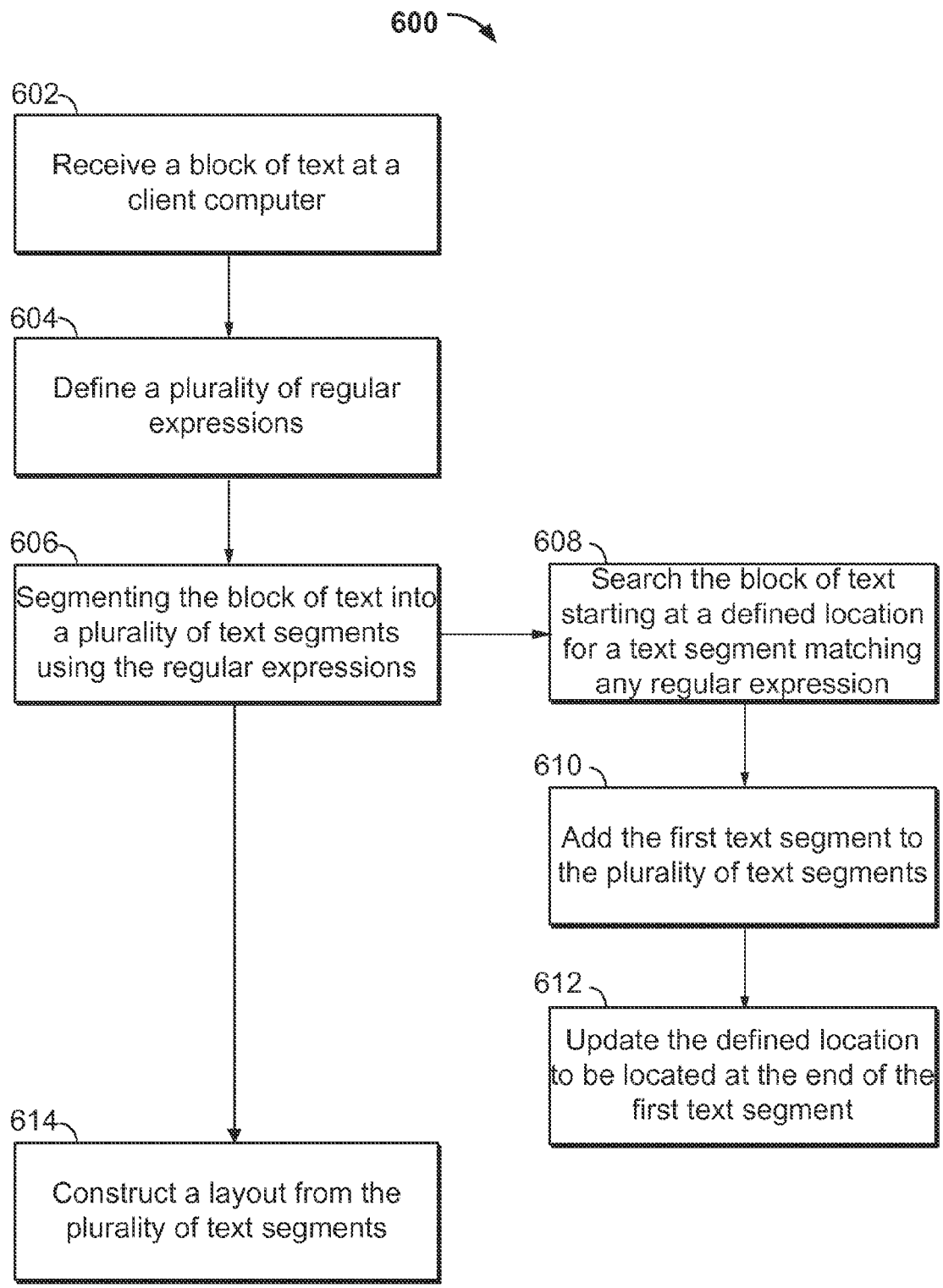
FIG. 6 shows a method for segmenting text for layout on a web browser in accordance with an implementation as described herein.

Methods for segmenting text for layout on a web browser using regular expressions are now described. FIG. 6 shows a method 600 for segmenting text for layout on a web browser. The method includes receiving a block of text at a client computer and defining a plurality of regular expressions, where a first regular expression in the plurality of regular expressions is used to search for a word or a word boundary. The method further includes segmenting the block of text into a plurality of text segments, where the segmenting includes searching the block of text starting at a defined location for a first text segment that matches any of the plurality of regular expressions, adding the first text segment to the plurality of text segments, and updating the defined location to be located at the end of the first text segment within the block of text. The method further includes constructing a layout of the block of text using the plurality of text segments. Method 600 may be performed by a client computer such as client computer 216 illustrated in FIG. 2.

Method 600 begins when a client computer receives a block of text, shown at 602. The client computer is in communication with a server that provides the block of text. For example, the server may be a cloud computing service that provides the client computer with access to files stored on the cloud computing service. The server provides a user interface to a web browser executing on the client computer to display the contents of the file to the user. The user interface includes a layout engine for generating a layout of the file, including the block of text, for rendering. After the client computer receives the block of text, it defines a plurality of regular expressions, shown at 604. The regular expressions are used to search for words or word boundaries such as spaces, tabs, line breaks, paragraph breaks, or page breaks. A regular expression for a word may be defined as a series of text elements that does not include any word boundary. Regular expressions may also be used to search for Chinese, Japanese, or Korean words. Multiple regular expressions may be constructed for CJK words, including words that cannot precede a line break, words that cannot follow a line break, and words that can precede or follow a line break. Regular expressions may also be used to search for character values that represent plug-in objects. The text may include special character values that are placeholders for plug-in objects, and a plug-in registry associates plug-in objects with character values. The regular expression searches for these character values. The regular expressions may be defined by the server and sent to the client computer as part of the layout engine.

After the regular expressions have been defined, the client computer segments the block of text, shown as 606. The layout engine uses the regular expressions to segment the block of text into a plurality of text segments such that for layout purposes a line break may be inserted before or after each text segment. The block of text is stored in an array such as spacer array 400 in FIG. 4. Starting at the beginning of the array, the layout engine searches the block of text for a series of consecutive text elements that match any of the regular expressions, shown as 608. For example, the block of text may begin with the word "The" followed by a space. The word "The" matches a regular expression that is intended to match any word, and so the word "The" becomes a text segment. Once a match has been found, the text segment is stored in a text segment array, shown at 610. An index or pointer is used to keep track of the location that the layout engine has most recently searched. After the text segment is stored, the index is updated to point directly after the recently stored text segment in the spacer array, shown at 612. The layout engine then starts from that location and searches the block of text for the next text segment that matches any of the regular expressions. The layout engine continues this process until the entire block of text is segmented. An example of the segmenting process is the getNextWord function discussed above.

The layout engine may also scan the block of text to identify locations where the text direction or text style changes. These changes cannot be captured by regular expressions, but the layout engine may store the locations separately. When the layout engine is segmenting the text, it also checks the locations of text direction or style changes and may further segment the text at these locations. For example, if a text direction or style change occurs in the middle of a segmented word, the word is segmented into two sub-segments and stored in the text segment array instead of the whole word. In addition, certain additional rules may apply for certain languages. Post processing routines and APIs may be used to segment the text further for those languages. After the text has been segmented, the client computer constructs a layout of the block of text using the plurality of text segments, shown as 614. The layout engine arranges the plurality of text segments for rendering and can insert line breaks between any two consecutive text segments. This allows the layout engine to lay out the text given constraints such as screen size, web browser window size, the amount of space allocated for text, margins, or font size and style. In this manner, method 600 provides a way to use regular expressions to segment text for layout on a web browser.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for segmenting text for layout on a web browser, the method comprising:
 receiving a block of text at a client computer;
 defining a plurality of regular expressions, wherein a first regular expression in the plurality of regular expressions is used to search for a word or a word boundary;
 segmenting, by the client computer, the block of text into a plurality of text segments, wherein the segmenting comprises:
  searching the block of text starting at a defined location for a first text segment that matches any of the plurality of regular expressions;
  searching the first text segment for a change in text style;
  segmenting the first text segment into two sub-segments at the location of the change in text style to create a modified first segment and a second segment;
  adding the modified first text segment to the plurality of text segments; and
  updating the defined location to be located at the end of the modified first text segment within the block of text; and
 constructing, by the client computer, a layout of the block of text using the plurality of text segments, wherein constructing the layout comprises automatically inserting a line break before the modified first segment.

2. The method of claim 1, wherein the word boundary is selected from the group consisting of a space, a tab, a line break, a paragraph break, and a page break.

3. The method of claim 1, wherein the segmenting further comprises:
 searching the first text segment for a change in text direction; and
 segmenting the first text segment into two sub-segments at the location of the change in text direction.

4. The method of claim 1, wherein a second regular expression in the plurality of regular expressions matches a Chinese, Japanese, or Korean word.

5. The method of claim 4, wherein the word cannot precede a line break.

6. The method of claim 4, wherein the word cannot follow a line break.

7. The method of claim 1, wherein constructing the layout includes inserting a line break after the first text segment.

8. The method of claim 1, wherein a third regular expression in the plurality of regular expressions matches a character value representing a plug-in object.

9. The method of claim 1, wherein the client computer receives the block of text from a server.

10. The method of claim 9, wherein the server provides the client computer with a layout engine configured to define the plurality of regular expressions, segment the block of text, and construct the layout.

11. The method of claim 10, wherein the layout engine is executed by a web browser.

12. An apparatus for segmenting text for layout on a web browser, the apparatus comprising:
a client computer configured to:
receive a block of text;
define a plurality of regular expressions, wherein a first regular expression in the plurality of regular expressions is used to search for a word or a word boundary;
segment the block of text into a plurality of text segments, wherein the segmenting comprises:
searching the block of text starting at a defined location for a first text segment that matches any of the plurality of regular expressions;
searching the first text segment for a change in text style;
segmenting the first text segment into two sub-segments at the location of the change in text style to create a modified first segment and a second segment;
adding the modified first text segment to the plurality of text segments; and
updating the defined location to be located at the end of the modified first text segment within the block of text; and
construct a layout of the block of text using the plurality of text segments, wherein constructing the layout comprises automatically inserting a line break before the modified first segment.

13. The apparatus of claim 12, wherein the word boundary is selected from the group consisting of a space, a tab, a line break, a paragraph break, and a page break.

14. The apparatus of claim 12, wherein the client computer is further configured to:
search the first text segment for a change in text direction; and
segment the first text segment into two sub-segments at the location of the change in text direction.

15. The apparatus of claim 12, wherein a second regular expression in the plurality of regular expressions matches a Chinese, Japanese, or Korean word.

16. The apparatus of claim 15, wherein the word cannot precede a line break.

17. The apparatus of claim 15, wherein the word cannot follow a line break.

18. The apparatus of claim 12, wherein a third regular expression in the plurality of regular expressions matches a character value representing a plug-in object.

19. The apparatus of claim 12, wherein the client computer receives the block of text from a server.

20. The apparatus of claim 19, wherein the server provides the client computer with a layout engine configured to define the plurality of regular expressions, segment the block of text, and construct the layout.

21. The apparatus of claim 20, wherein the layout engine is executed by a web browser.

22. A system for segmenting text for layout on a web browser, the system comprising:
a plurality of client computers; and
a server configured to provide each of the plurality of client computers with a layout engine for:
receiving a block of text from the server;
defining a plurality of regular expressions, wherein each of the plurality of regular expressions is used to search for a word or a word boundary;
segmenting the block of text into a plurality of text segments, wherein the segmenting comprises:
searching the block of text starting at a defined location for a first text segment that matches any of the plurality of regular expressions;
searching the first text segment for a change in text style;
segmenting the first text segment into two sub-segments at the location of the change in text style to create a modified first segment and a second segment;
adding the modified first text segment to the plurality of text segments; and
updating the defined location to be located at the end of the modified first text segment within the block of text; and
constructing a layout of the block of text using the plurality of text segments, wherein constructing the layout comprises automatically inserting a line break before the modified first segment.

23. The system of claim 22, wherein the layout engine is executed by a web browser on each of the plurality of client computers.

24. The system of claim 22, wherein the word boundary is selected from the group consisting of a space, a tab, a line break, a paragraph break, and a page break.

25. The system of claim 22, wherein the segmenting further comprises:
searching the first text segment for a change in text direction; and
segmenting the first text segment into two sub-segments at the location of the change in text direction.

26. The system of claim 22, wherein a second regular expression in the plurality of regular expressions matches a Chinese, Japanese, or Korean word.

27. The system of claim 26, wherein the word cannot precede a line break.

28. The system of claim 26, wherein the word cannot follow a line break.

29. The system of claim 22, wherein a third regular expression in the plurality of regular expressions matches a character value representing a plug-in object.

* * * * *